(12) United States Patent
Li et al.

(10) Patent No.: US 11,137,075 B2
(45) Date of Patent: Oct. 5, 2021

(54) QUANTITATIVE TANK BOTTOM SLUDGE VALVE

(71) Applicant: CITIC Dicastal Co., Ltd., Qinhuangdao (CN)

(72) Inventors: Naili Li, Qinhuangdao (CN); Kai Li, Qinhuangdao (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 0 days.

(21) Appl. No.: 16/812,301

(22) Filed: Mar. 7, 2020

(65) Prior Publication Data

US 2021/0033209 A1 Feb. 4, 2021

(30) Foreign Application Priority Data

Jul. 30, 2019 (CN) .......................... 201910687872.2

(51) Int. Cl.
*F16K 1/44* (2006.01)
*C02F 11/121* (2019.01)

(52) U.S. Cl.
CPC ............ *F16K 1/443* (2013.01); *C02F 11/121* (2013.01)

(58) Field of Classification Search
CPC ..... F16K 1/36; F16K 1/32; F16K 1/12; F16K 1/44; F16K 1/443; F16K 1/526
USPC ......................................... 251/144; 137/395
See application file for complete search history.

(56) References Cited

U.S. PATENT DOCUMENTS

| 2,953,345 | A | * | 9/1960 | Slemmons | F16K 39/04 251/144 |
| 3,868,321 | A | * | 2/1975 | Gough | B01D 21/245 210/86 |
| 5,309,934 | A | * | 5/1994 | Jaeger | F16K 1/12 137/1 |
| 6,814,102 | B2 | * | 11/2004 | Hess | F16K 1/44 137/315.09 |
| 2013/0327972 | A1 | * | 12/2013 | Quirll | F02M 26/11 251/324 |
| 2016/0084049 | A1 | * | 3/2016 | Vadasz | F16K 1/54 417/514 |
| 2020/0056704 | A1 | * | 2/2020 | Ichimaru | F16K 1/36 |
| 2020/0300354 | A1 | * | 9/2020 | Qiu | F16H 57/0435 |
| 2020/0347946 | A1 | * | 11/2020 | Liebhart | F04B 53/06 |

FOREIGN PATENT DOCUMENTS

WO WO-2018066121 A1 * 4/2018 ............... F16K 1/36

* cited by examiner

*Primary Examiner* — Kelsey E Cary
(74) *Attorney, Agent, or Firm* — IPro, PLLC

(57) ABSTRACT

The present disclosure provides a quantitative tank bottom sludge valve. The extension and retraction of a cylinder drives a lower valve body, a valve rod, an upper valve body and respective accessories to move up and down, and sludge at the bottom of a water tank that is deposited to the upper part of an upper valve plate and the lower part of an upper valve body gasket is discharged quantitatively, thereby saving water and avoiding blockage; moreover, the quantitative tank bottom sludge valve has simple components in structure, and it is low in processing and assembly precision requirements, low cost, convenient to install and maintain, and suitable for mass production and use.

7 Claims, 3 Drawing Sheets

US 11,137,075 B2

QUANTITATIVE TANK BOTTOM SLUDGE VALVE

FIELD

The present disclosure relates to the technical field of casting devices, specifically to the technical field of sludge discharging mechanisms of wet dust collectors of surface treatment devices, and more specifically to a quantitative tank bottom sludge valve.

BACKGROUND

In the casting process of aluminum alloy parts, the surfaces of castings and molds need to be treated using surface treatment devices to remove dirt from the surfaces, thereby improving the surface finish. A surface treatment device needs to be equipped with a dry or wet dust collector to remove dust. The sludge deposited in a water tank of the wet dust collector should be discharged in time, otherwise the dust removal effect will be affected. The scraper type sludge discharging mechanism is expensive and difficult to repair and maintain. The valve switching type sludge discharging mechanism discharges a large amount of sewage at a high frequency of discharging sludge, and is easily blocked by sludge at a low frequency. Manual cleaning of the water tank is time-consuming and laborious.

SUMMARY

An embodiment of the present application provides a quantitative tank bottom sludge valve, which solves the problem that a valve switching type sludge discharging mechanism discharges a large amount of drainage or is easily blocked by sludge, can regularly discharge sludge or dirty water (discharge quantitative water in the absence of sludge), thereby saving water and avoiding blockage, the quantitative tank bottom sludge valve has simple components in structure, and it is low in processing and assembly precision requirements, low cost, convenient to install and maintain, and suitable for mass production and use.

In a first aspect, a quantitative sludge valve is provided, wherein comprising a cylinder, a lower valve plate, links, an upper valve plate, a sludge guide plate, an upper valve body, an upper valve body gasket, a gasket pressure plate, a valve rod, a gasket tapered pressure block, a lower valve body gasket, and a lower valve body; the cylinder is located below the lower valve plate, a barrel of the cylinder is fixed to the bottom surface of the lower valve plate, four links are vertically fixed on the upper surface of the lower valve plate, the lower ends of the four links are fixed to the upper surface of the lower valve plate and the upper ends are fixed to the bottom surface of the upper valve plate, and the upper valve plate is parallel to the lower valve plate; the four links pass through the sludge guide plate, and the sludge guide plate has a circular truncated tapered surface and is mounted on the four links; a piston rod of the cylinder sequentially passes through a first through hole in the middle of the lower valve plate and a second through hole in the middle of the sludge guide plate, and is vertically fixedly mounted to the lower valve body, the lower valve body gasket is disposed above the lower valve body, and the gasket tapered pressure block is disposed above the lower valve body gasket; the gasket tapered pressure block is fixedly assembled to the lower valve body, and presses and locates the lower valve body gasket tightly; a threaded hole is formed in the top of the gasket tapered pressure block, the lower end of the valve rod is provided with threads and assembled to the gasket tapered pressure block by threaded connection, and the upper end of the valve rod is provided with threads, sequentially passes through a first central hole in the middle of the upper valve plate, a second central hole in the middle of the gasket pressure plate and a third central hole in the middle of the upper valve body gasket, and is then assembled to the upper valve body by threaded connection; the gasket pressure plate is fixedly assembled to the upper valve body, and the gasket pressure plate presses and locates the upper valve body gasket tightly; the upper valve plate is mounted to a water tank bottom flange by bolts; both the maximum outer diameter of the upper valve body and the outer diameter of the upper valve body gasket are smaller than the pipe inner diameter of the water tank bottom flange, and larger than the diameter of the first central hole of the upper valve plate; the outer diameter of the gasket pressure plate is smaller than the diameter of the first central hole of the upper valve plate; both the outer diameter of the lower valve body and the outer diameter of the lower valve body gasket are larger than the diameter of the first central hole of the upper valve plate; the maximum outer diameter of the gasket tapered pressure block is smaller than the diameter of the first central hole of the upper valve plate.

In some embodiments, wherein further comprising an outer shield fixedly mounted to the upper valve plate.

In some embodiments, wherein further comprising a water guide rod fixedly mounted to the top of the upper valve body.

In some embodiments, wherein the water guide rod is processed with spiral grooves to increase the water guiding effect. When the water guide rod moves up and down, the gap between the outer wall of the rod and the sludge can guide a small amount of water at the top to the tapered surface of the upper valve body, which facilitates the sludge to deposit to the lower part of the upper valve body along the tapered surface.

In some embodiments, wherein the upper valve body is a cone.

In some embodiments, wherein the upper valve body gasket and the lower valve body gasket are made of polyurethane, rubber or plastic.

In some embodiments, wherein comprising a timer and a solenoid valve, the timer controls the solenoid valve to operate at a set time, and the solenoid valve controls the extension and retraction of the cylinder.

Compared with the prior art, the present disclosure has the beneficial effects:

The present disclosure provides a quantitative tank bottom sludge valve, including a cylinder, a lower valve plate, links, a sludge guide plate, an upper valve plate, an upper valve body, an upper valve body gasket, a gasket pressure plate, a valve rod, a gasket tapered pressure block, a lower valve body gasket and a lower valve body, where the extension and retraction of the cylinder drives the lower valve body, the valve rod, the upper valve body and respective accessories to move up and down, and sludge at the bottom of a water tank that is deposited to the upper part of the upper valve plate and the lower part of the upper valve body gasket is discharged quantitatively, thereby saving water and avoiding blockage; moreover, the quantitative tank bottom sludge valve has simple components in structure, and it is low in processing and assembly precision requirements, low cost, convenient to install and maintain, and suitable for mass production and use.

BRIEF DESCRIPTION OF THE DRAWINGS

In order to more clearly explain the technical solution in the embodiments of the application, drawings which require to be used in description of the embodiments are simply introduced below, obviously, the drawings in description below are some embodiments of the application, and those having ordinary skill in the art can further acquire other drawings without creative efforts according to those drawings.

Figure 1:
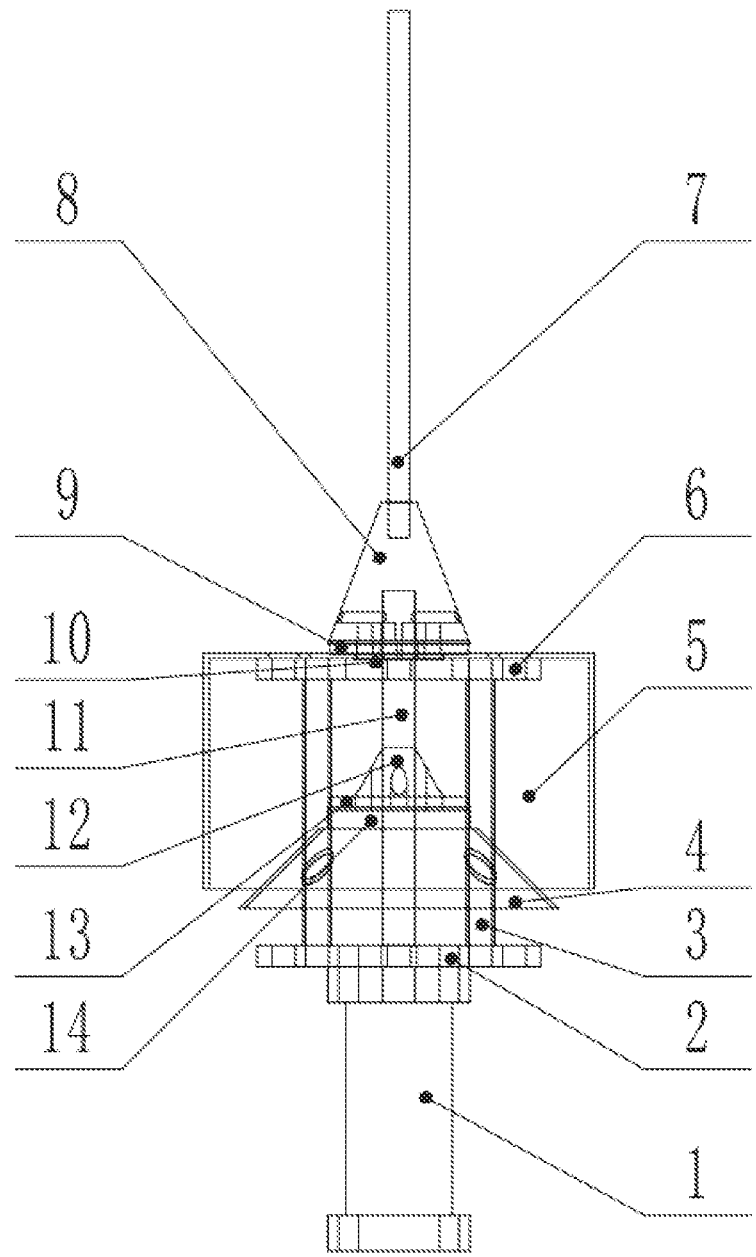
FIG. 1 is a schematic structural diagram of a quantitative tank bottom sludge valve according to the present application.
Figure 2:
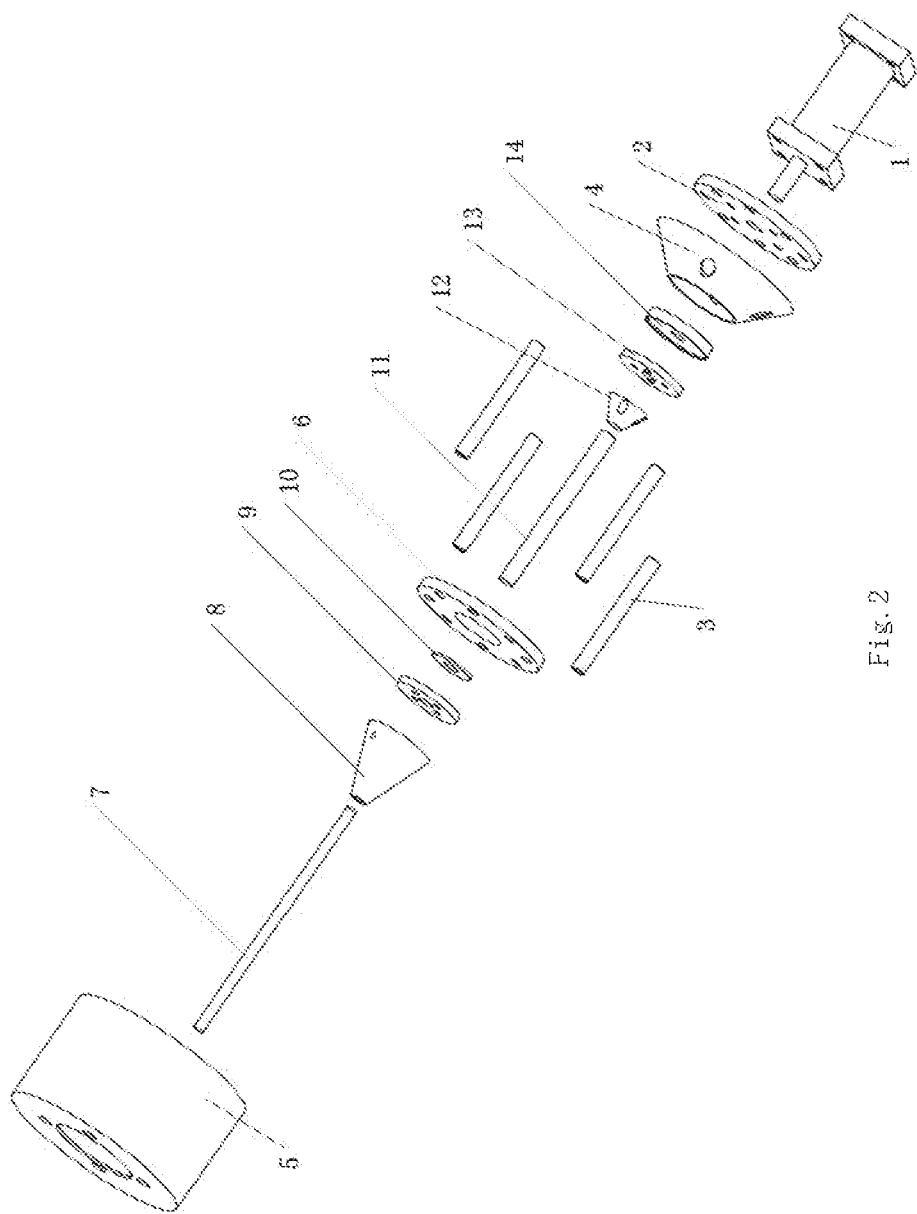
FIG. 2 is a disassembled schematic structural diagram of the quantitative tank bottom sludge valve according to the present application.
Figure 3:
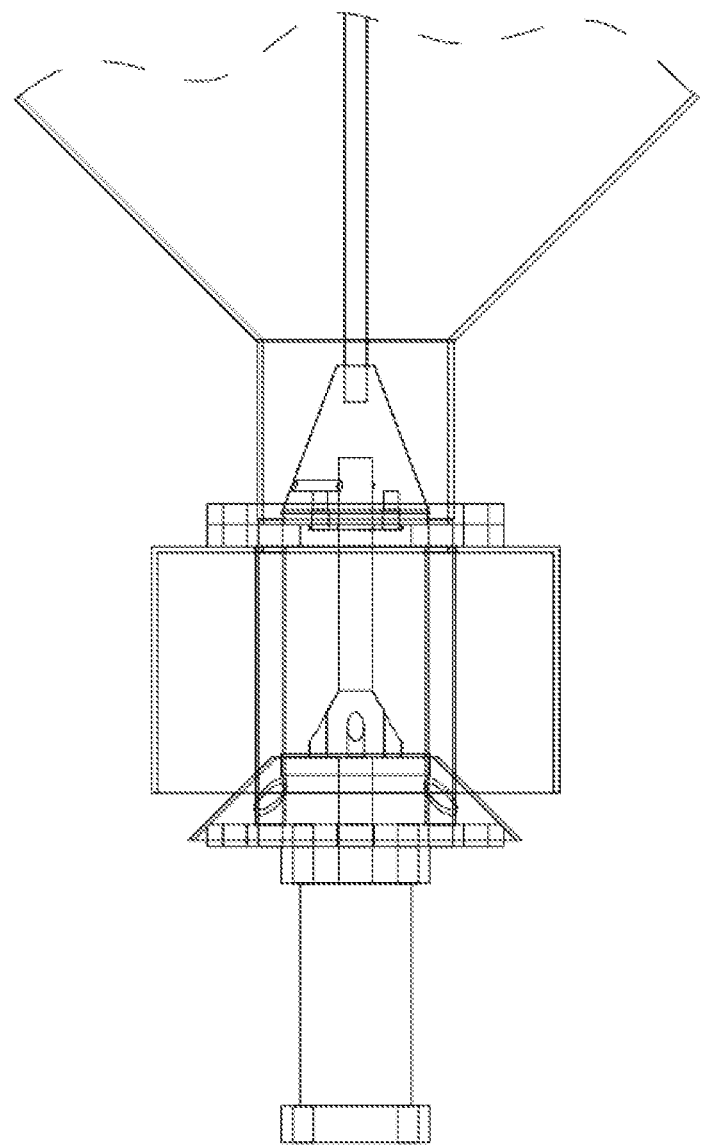
FIG. 3 is an installation schematic structural diagram of the quantitative tank bottom sludge valve and a water tank according to the present application.

In which: 1—cylinder, 2—low valve plate, 3—link, 4—sludge guide plate, 5—outer shield, 6—upper valve plate, 7—water guide rod, 8—upper valve body, 9—upper valve body gasket, 10—gasket pressure plate, 11—valve rod, 12—gasket tapered pressure block, 13—lower valve body gasket, 14—low valve body, 15—water tank, 16—water tank bottom flange.

DETAILED DESCRIPTION OF EMBODIMENTS

The technical solution in the embodiments of the application is clearly and completely described in combination with drawings of the embodiments of the application below, and obviously, the described embodiments are part of embodiments of the application rather than all embodiments. Based on the embodiments of the application, all the other embodiments obtained by those having ordinary skill in the art without any creative works are within the protection scope of the application.

The terms 'first', 'second', 'third', 'fourth' and the like in the specification and in the claims of the application are used for distinguishing different objects but not for describing a specific sequence. Furthermore, the terms 'comprise' and 'have' as well as their any variations are intended to cover a non-exclusive inclusion. For example, a process, method, system, product or equipment comprising a series of steps or units does not limit steps or units which have been listed, but selectively further comprises steps or units which are not listed, or selectively further comprises other inherent steps or units for the process, method, product or equipment.

Reference in the specification to 'embodiments' of the application means that a particular feature, structure or characteristic described in connection with the embodiments is included in at least one embodiment of the application. The appearances of the phrase 'the embodiments' in various places in the specification are not necessarily all referring to the same embodiment, nor are separate or alternative embodiments necessarily mutually exclusive of other embodiments. It will be explicitly and implicitly understood by those skilled in the art that the embodiments described in the application can be combined to other embodiments.

In order to further understand the content, features and functions of the disclosure, the following embodiments are given and illustrated with the attached drawings as follows.

Embodiment 1

The first embodiment of the present application will be described in combination with FIGS. 1-4. A quantitative tank bottom sludge valve wherein it includs a cylinder 1, a lower valve plate 2, links 3, a sludge guide plate 4, an outer shield 5, an upper valve plate 6, a water guide rod 7, an upper valve body 8, an upper valve body gasket 9, a gasket pressure plate 10, a valve rod 11, a gasket tapered pressure block 12, a lower valve body gasket 13, and a lower valve body 14.

The cylinder 1 is mounted on the lower valve plate 2, the cylinder 1 is located below the lower valve plate 2, and a barrel of the cylinder 1 is fixed to the bottom surface of the lower valve plate 2. The lower valve plate 2 is assembled with the upper valve plate 6 by four links 3 and bolts, the upper valve plate 6 is parallel to the lower valve plate 2 after assembly, the four links 3 are vertically fixed on the upper surface of the lower valve plate 2, the lower ends of the four links 3 are fixed to the upper surface of the lower valve plate 2 and the upper ends are fixed to the bottom surface of the upper valve plate 6, and the upper valve plate 6 is parallel to the lower valve plate 2; the four links 3 pass through the sludge guide plate 4, the sludge guide plate 4 has a circular truncated tapered surface and is mounted on the four links 3, the outer shield 5 is fixedly mounted on the upper valve plate 6 and covers the components below the upper valve plate 6 as shown in FIG. 1.

A piston rod of the cylinder 1 sequentially passes through a first through hole in the middle of the lower valve plate 2 and a second through hole in the middle of the sludge guide plate 4, and is vertically fixedly mounted to the lower valve body 14 by threaded connection, a flat cylindrical lower valve body gasket 13 is disposed above the lower valve body 14. The gasket tapered pressure block 12 is disposed above the lower valve body gasket 13; the gasket tapered pressure block 12 is fixedly assembled to the lower valve body 14 by bolts, and presses and locates the lower valve body gasket 13 tightly; the upper valve body gasket 9 may be made of polyurethane, rubber or plastic.

A threaded hole is formed in the top of the gasket tapered pressure block 12, the lower end of the valve rod 11 is provided with threads and assembled to the gasket tapered pressure block 12 by threaded connection, and the upper end of the valve rod 11 is provided with threads, sequentially passes through a first central hole in the middle of the upper valve plate 6, a second central hole in the middle of the gasket pressure plate 10 and a third central hole in the middle of the upper valve body gasket 9, and is then assembled to the upper valve body 8 by threaded connection. The lower valve body gasket 13 may be made of polyurethane, rubber or plastic. The upper valve body 8 is a cone, and the tapered surface facilitates sludge to deposit and slide to the lower part of the upper valve body 8. The gasket pressure plate 10 is fixedly assembled to the upper valve body 8 by bolts, and the gasket pressure plate 10 presses and locates the upper valve body gasket 9 tightly. The upper valve plate 6 is mounted to a water tank bottom flange 16 by bolts, the water guide rod 7 is fixedly mounted to the top of the upper valve body 8, and the water guide rod 7 is processed with spiral grooves to increase the water guiding effect. When the water guide rod 7 moves up and down, the gap between the outer wall of the rod and the sludge can guide a small amount of water at the top to the tapered surface of the upper valve body 8, which facilitates the sludge to deposit to the lower part of the upper valve body 8 along the tapered surface.

The maximum outer diameter of the upper valve body 8 is equal to the outer diameter of the upper valve body gasket 9. Both the maximum outer diameter of the upper valve body 8 and the outer diameter of the upper valve body gasket 9 are smaller than the pipe inner diameter of the water tank bottom flange 16, and larger than the diameter of the first central hole of the upper valve plate 6; the outer diameter of the gasket pressure plate 10 is smaller than the diameter of the first central hole of the upper valve plate 6; the outer diameter of the lower valve body 14 is equal to the outer diameter of the lower valve body gasket 13. Both the outer diameter of the lower valve body 14 and the outer diameter of the lower valve body gasket 13 are larger than the diameter of the first central hole of the upper valve plate 6; the maximum outer diameter of the gasket tapered pressure block 12 is smaller than the diameter of the first central hole of the upper valve plate 6.

Figure 4:
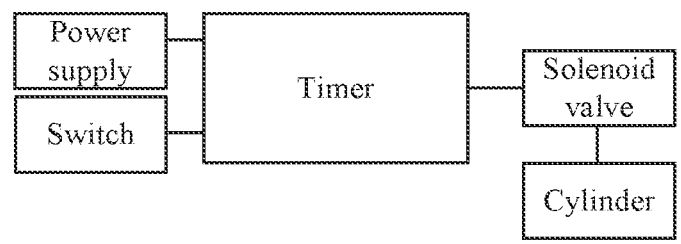
FIG. 4 is a control principle diagram of the quantitative tank bottom sludge valve according to the present application.

The circuit control principle diagram of the present disclosure is as shown in FIG. 4, including a timer and a solenoid valve. The timer is used to control the extension and retraction of the cylinder 1 and control the solenoid valve to operate at the set time, the solenoid valve controls the extension and retraction of the cylinder 1, thereby achieving a function of regularly discharging sludge.

In actual operation, when a cylinder rod of the cylinder 1 is extended, the lower valve body 14, the valve rod 11, the upper valve body 8 and respective accessories are sequentially extended, then the lower valve body gasket 13 presses on the lower surface of the upper cover plate 6 to play a sealing role, the sewage and sludge in the water tank 15 are not discharged, at this time, the upper valve body 8 is away from the upper valve plate 6, and the sludge in the water tank 15 deposits and piles above the upper valve plate 6. When the cylinder rod of the cylinder 1 is retracted, the lower valve body 14, the valve rod 11, the upper valve body 8 and the respective accessories of the three are retracted sequentially, and then the upper valve body gasket 9 presses the upper surface of the upper valve plate 6 to play a sealing role. During retraction process, the upper valve body 8 and the bottom surface of the upper valve body gasket 9 forcibly discharge the sludge accumulated on the upper valve plate 6 along an annular hole between the first central hole of the upper valve plate 6 and the valve rod 11, and the discharged sludge slides into a collecting apparatus along the tapered surfaces of the gasket tapered pressure block 12 and the sludge guide plate 4. The stroke of the cylinder 1, the bottom areas of the upper valve body 8 and the upper valve body gasket 9, and the annular hole between the first central hole of the upper valve plate 6 and the valve rod 11 are constant values, and the retraction time of the cylinder 1 is also a constant value, so the sludge discharged each time is quantitative under normal conditions (reasonable deposition time and consistent form of sludge).

The present disclosure provides a quantitative tank bottom sludge valve, including a cylinder, a lower valve plate, links, a sludge guide plate, an outer shield, an upper valve plate, a water guide rod, an upper valve body, an upper valve body gasket, a gasket pressure plate, a valve rod, a gasket tapered pressure block, a lower valve body gasket and a lower valve body, where the extension and retraction of the cylinder drives the lower valve body, the valve rod and the upper valve body to move up and down, and sludge at the bottom of a water tank that is deposited to the upper part of the upper valve plate and the lower part of the upper valve body gasket is discharged quantitatively, thereby solving the problems of drainage of a large amount of water and sludge blockage in a valve switching mode; the extension and retraction of the cylinder can be controlled by using a timer to discharge sludge regularly; moreover, the quantitative tank bottom sludge valve has simple components in structure, and it is low in processing and assembly precision requirements, low cost, convenient to install and maintain, and suitable for mass production and use.

The embodiments of the application are described in detail above, particular examples are used herein to explain the principle and embodiments of the application, and the above description of the embodiments is only used to help understanding the methods and core concept of the application; and meanwhile, for those having ordinary skill in the art, according to the idea of the application, there will be changes in the specific implementation mode and application scope, in conclusion, the contents of the specification shall not be construed as a limitation of the application.

The invention claimed is:

1. A quantitative tank bottom sludge valve comprising a cylinder, a lower valve plate, links, an upper valve plate, a sludge guide plate, an upper valve body, an upper valve body gasket, a gasket pressure plate, a valve rod, a gasket tapered pressure block, a lower valve body gasket, and a lower valve body;

the cylinder is located below the lower valve plate, a barrel of the cylinder is fixed to a bottom surface of the lower valve plate, four links are vertically fixed on an upper surface of the lower valve plate, lower ends of the four links are fixed to the upper surface of the lower valve plate and upper ends are fixed to a bottom surface of the upper valve plate, and the upper valve plate is parallel to the lower valve plate; the four links pass through the sludge guide plate, and the sludge guide plate has a circular truncated tapered surface and is mounted on the four links;

a piston rod of the cylinder sequentially passes through a first through hole in a middle of the lower valve plate and a second through hole in a middle of the sludge guide plate, and is vertically fixedly mounted to the lower valve body, the lower valve body gasket is disposed above the lower valve body, and the gasket tapered pressure block is disposed above the lower valve body gasket; the gasket tapered pressure block is fixedly assembled to the lower valve body, and presses and locates the lower valve body gasket tightly;

a threaded hole is formed in a top of the gasket tapered pressure block, the lower end of the valve rod is provided with threads and assembled to the gasket tapered pressure block by threaded connection, and the upper end of the valve rod is provided with threads, sequentially passes through a first central hole in the middle of the upper valve plate, a second central hole in the middle of the gasket pressure plate and a third central hole in the middle of the upper valve body gasket, and is then assembled to the upper valve body by threaded connection; the gasket pressure plate is fixedly assembled to the upper valve body, and the gasket pressure plate presses and locates the upper valve body gasket tightly; the upper valve plate is mounted to a water tank bottom flange by bolts;

both a maximum outer diameter of the upper valve body and an outer diameter of the upper valve body gasket are smaller than a pipe inner diameter of the water tank bottom flange, and larger than a diameter of the first central hole of the upper valve plate;

an outer diameter of the gasket pressure plate is smaller than the diameter of the first central hole of the upper valve plate;

both an outer diameter of the lower valve body and an outer diameter of the lower valve body gasket are larger than the diameter of the first central hole of the upper valve plate;

a maximum outer diameter of the gasket tapered pressure block is smaller than the diameter of the first central hole of the upper valve plate.

2. The quantitative sludge valve according to claim 1, wherein further comprising an outer shield fixedly mounted to the upper valve plate.

3. The quantitative sludge valve according to claim 1, wherein further comprising a water guide rod fixedly mounted to a top of the upper valve body.

4. The quantitative sludge valve according to claim 3, wherein the water guide rod is processed with spiral grooves to increase a water guiding effect.

5. The quantitative sludge valve according to claim 1, wherein the upper valve body is a cone.

6. The quantitative sludge valve according to claim 1, wherein the upper valve body gasket and the lower valve body gasket are made of polyurethane, rubber or plastic.

7. The quantitative sludge valve according to claim 1, wherein comprising a timer and a solenoid valve, the timer controls the solenoid valve to operate at a set time, and the solenoid valve controls extension and retraction of the cylinder.

\* \* \* \* \*